(12) United States Patent
Diamond et al.

(10) Patent No.: US 12,447,969 B2
(45) Date of Patent: Oct. 21, 2025

(54) LIMITED USE DRIVING OPERATIONS FOR VEHICLES

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Andrew Denis Lewandowski, Sterling Heights, MI (US); Lars Niklas Pettersson, Novi, MI (US); Lorne Forsythe, Wind Lake, WI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 17/899,796

(22) Filed: Aug. 31, 2022

(65) Prior Publication Data
US 2024/0067179 A1  Feb. 29, 2024

(51) Int. Cl.
| | |
|---|---|
| *B60W 30/182* | (2020.01) |
| *B60W 10/08* | (2006.01) |
| *B60W 10/184* | (2012.01) |
| *B60W 10/20* | (2006.01) |

(Continued)

(52) U.S. Cl.
CPC .......... *B60W 30/182* (2013.01); *B60W 10/08* (2013.01); *B60W 10/184* (2013.01); *B60W 10/20* (2013.01); *B60W 30/143* (2013.01); *B62D 1/14* (2013.01); *B60W 2520/00* (2013.01); *B60W 2540/10* (2013.01);
(Continued)

(58) Field of Classification Search
CPC .. B60W 30/182; B60W 10/08; B60W 10/184; B60W 10/20; B60W 30/143; B60W 2520/00; B60W 2540/10; B60W 2540/16; B60W 2540/18; B60W 2710/207; B62D 1/14; B62D 7/1509
See application file for complete search history.

(56) References Cited

U.S. PATENT DOCUMENTS

| | | | |
|---|---|---|---|
| 11,279,230 B2 | 3/2022 | O'Rourke et al. | |
| 2014/0224600 A1* | 8/2014 | Rosenbaum | B60T 7/085 188/158 |
| 2018/0088582 A1* | 3/2018 | Kong | B60W 50/0097 |

(Continued)

FOREIGN PATENT DOCUMENTS

| | | | | |
|---|---|---|---|---|
| DE | 102005019339 A1 * | 6/2006 | | B62D 15/025 |
| JP | 2012131411 A * | 7/2012 | | |
| JP | 2021079780 A | 5/2021 | | |

OTHER PUBLICATIONS

"GMC Crabwalk—Quick Start Guide" NPL 2022 Link: https://web.archive.org/web/20220703173352/https://www.gmc.com/support/quick-start-guides/hummer-ev/crabwalk#.*

*Primary Examiner* — Rachid Bendidi
*Assistant Examiner* — Joseph Anderson Yanoska
(74) *Attorney, Agent, or Firm* — David B Kelley; Brooks Kushman P.C.

(57) ABSTRACT

A vehicle includes a front axle having left and right front wheels and a rear axle having left and right rear wheels. A steering-wheel assembly is used to control at least the front wheels. Left and right driver-actuatable inputs are supported by the steering wheel assembly. A vehicle controller is programmed to, responsive to actuation of the driver-actuatable inputs, place the vehicle in one or more operating modes such as tank turn, trail turn assist, or diagonal driving mode.

12 Claims, 8 Drawing Sheets

(51) Int. Cl.
*B60W 30/14* (2006.01)
*B62D 1/14* (2006.01)
(52) U.S. Cl.
CPC ..... *B60W 2540/16* (2013.01); *B60W 2540/18* (2013.01); *B60W 2710/207* (2013.01)

(56) References Cited

U.S. PATENT DOCUMENTS

| | | | |
|---|---|---|---|
| 2019/0031234 A1* | 1/2019 | Schall | B62D 6/002 |
| 2021/0197820 A1 | 7/2021 | Keller | |
| 2022/0097704 A1 | 3/2022 | Collins | |
| 2022/0227399 A1* | 7/2022 | Kneip | B60W 60/0061 |
| 2023/0037740 A1* | 2/2023 | Ha | B60W 10/22 |

* cited by examiner

LIMITED USE DRIVING OPERATIONS FOR VEHICLES

TECHNICAL FIELD

The present disclosure relates to limited use driving operations for vehicles that are operatable via driver-actuatable inputs.

BACKGROUND

Vehicles include a steering wheel for controlling a steering angle of the front wheels. Additional inputs may also be provided on the steering column. Some vehicles include paddle shifters for manually shifting an automatic transmission. In this arrangement, a paddle shifter is typically provided on each side, one for upshifts and one for downshifts.

SUMMARY

According to one embodiment, a vehicle includes a front axle having left and right front wheels and a front steering actuator configured to turn the left and right front wheels. A rear axle has left and right rear wheels and a rear steering actuator configured to turn the left and right rear wheels. The vehicle further includes a steering-wheel assembly and left and right driver-actuatable inputs supported by the steering wheel assembly. A controller is programmed to, in response to vehicle speed being less than a threshold and both of the driver-actuatable inputs being actuated, command a diagonal driving mode. The controller is further programmed to, in response to the vehicle being in the diagonal driving mode and the right input being actuated, command the front and rear steering actuators to turn the front wheels to the right and the rear wheels to the right, and, in response to the vehicle being in the diagonal driving mode and the left input being actuated, command the front and rear steering actuators to turn the front wheels to the left and the rear wheels to the left.

According to another embodiment, a vehicle includes a front right motor-and-wheel assembly, a front left motor-and-wheel assembly, a rear right motor-and-wheel assembly, and a rear left motor-and-wheel assembly. The vehicle includes inputs such as an accelerator pedal and left and right steering mounted driver-actuatable inputs. A vehicle controller is programmed to activate tank-turn mode in response to a driver request and vehicle speed being less than a threshold. In response to the accelerator pedal being depressed and the right steering mounted driver-actuatable input being actuated, the controller is programmed to command forward propulsion of the left front and rear motor-and-wheel assemblies and command reverse propulsion of the right front and rear motor-and-wheel assemblies, and, in response to release of the accelerator pedal, exit the tank-turn mode According to yet another embodiment, a vehicle includes a front axle having left and right front wheels and a steering actuator configured to turn the left and right front wheels and a rear axle having left and right rear wheels. A steering-wheel assembly has a steering wheel operably coupled to the steering actuator. Left and right driver-actuatable inputs are supported by the steering-wheel assembly. A controller is programmed to, in response to vehicle speed being less than a threshold, the steering wheel being turned beyond a threshold, and the right driver-actuatable inputs being actuated, (i) set a target speed for the right rear wheel based on the vehicle speed and (ii) brake the right rear wheel based on an error between a measured speed of the right rear wheel and the target speed.

DETAILED DESCRIPTION

Figure 1:
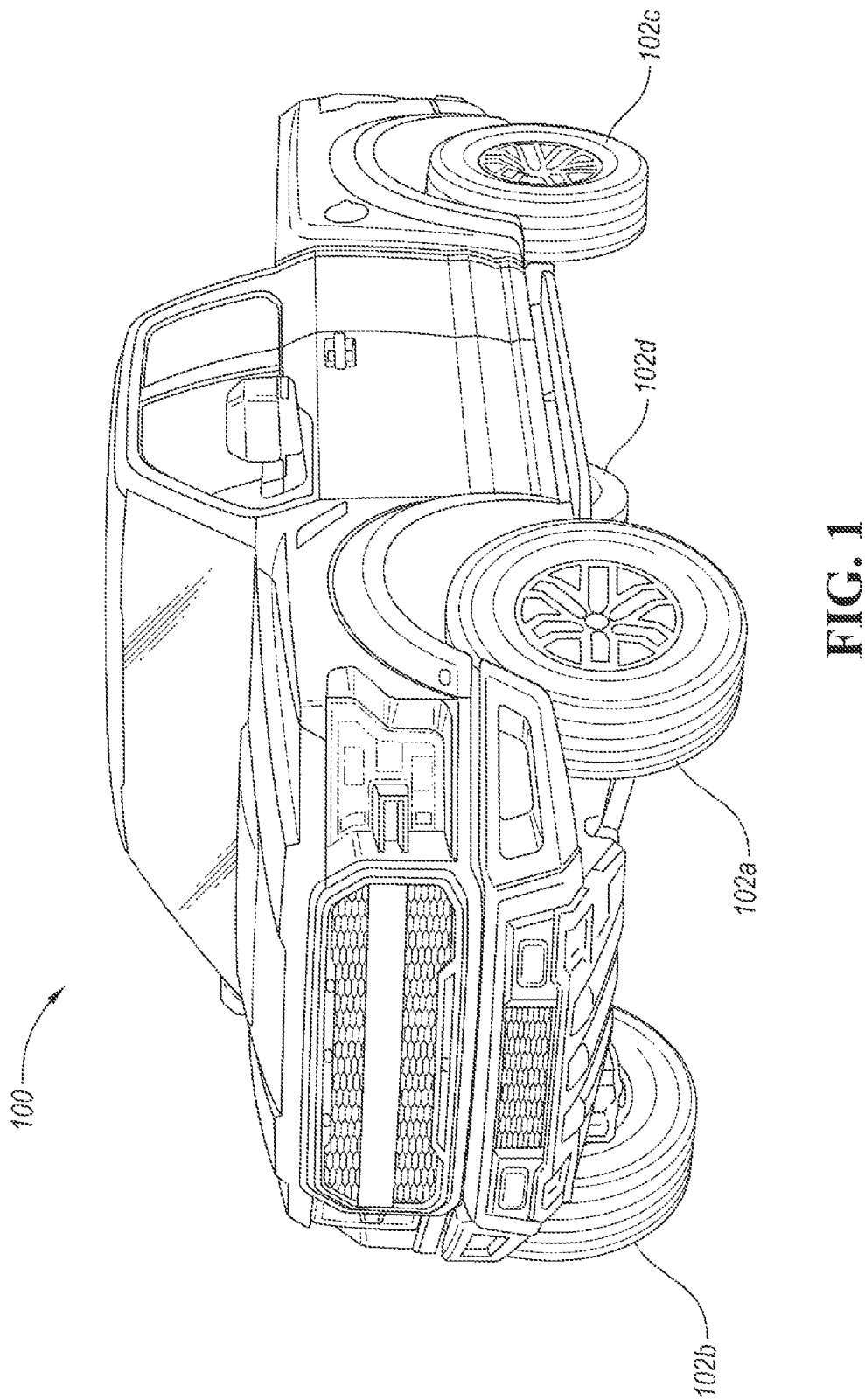
FIG. 1 illustrates an example vehicle in which the examples disclosed herein can be implemented.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Four-wheel vehicles, such as cars, SUVs, crossovers, or pickup trucks, may be used in off-road terrain that includes difficult ground conditions, such as snow, sand, mud, ruts, rocks, tight trails, etc. In these adverse ground conditions, the wheels (tires) of the vehicle may lose traction with the ground. As a result, one or more (or sometimes all) of the wheels slip and, thus, the vehicle cannot be driven forward or backwards. Increased maneuverability of the vehicle may also aid in traversing these difficult ground conditions.

A vehicle may have four-wheel steering capabilities. In a four-wheel steering vehicle, the rear wheels can be turned in the same direction or opposite direction as the front wheels. This helps with maneuverability, which is especially advantageous with larger vehicles like pickup trucks. In such vehicles, the front wheels are turned or steered by a front steering actuator and the rear wheels are turned or steered by a rear steering actuator. The front wheels can be driven by a front drive motor and the rear wheels can be driven by a separate rear drive motor.

The examples disclosed herein are directed to a vehicle with a controller, that can execute a set (e.g., a sequence or series) of instructions to steer and drive the wheels in a manner that can move the vehicle sideways, forward, or backward. The instruction(s) can be implemented as part of an off-road operation.

In one example, the front wheels are turned to the right and the rear wheels are turned to the left, such that the front wheels and the rear wheels are turned in opposite directions. Then, the front wheels are driven in the reverse direction while the rear wheels are driven in the forward direction. The reverse direction force from the front wheels and the forward direction force from the rear wheels counters or cancels out. However, because all of the wheels are turned, a net positive force is produced in the left direction. This net positive force drives or moves the vehicle laterally to the left, without moving the vehicle forward or reverse. Additionally, because all of the wheels are turned, the wheels can contact the surrounding ground (e.g., walls of a rut) for more traction and/or move some of the surrounding ground beneath the wheels, which further increases the traction of the vehicle. This enables the vehicle to traverse laterally or sideways out of the current adverse condition (e.g., out of a rut, out of a muddy patch, off of a patch of ice, etc.) and to a location where there is more traction. In an example right crawl operation disclosed herein, a similar process occurs but the front wheels are turned to the left and the rear wheels are turn to the right. This results in a net positive force to the right, which drives or moves the vehicle laterally to the right.

The examples disclosed herein also include a forward and reverse crawl operation. In an example forward crawl operation, the left front and rear wheels of the vehicle are turned to the right and the right front and rear wheels of the vehicle are turned to the left. Then, all of the wheels are driven in the forward direction. The left and right forces from the wheels counter or cancel out. However, because all of the wheels are driven forward, a net positive force is produced in the forward direction. This net positive force drives or moves the vehicle in a forward direction, without turning the vehicle to the left or right. Additionally, because all of the wheels are turned, the wheels can contact the surrounding ground (e.g., walls of a rut) for more traction and/or move some of the surrounding ground beneath the wheels, which further increases the traction of the vehicle. This enables the vehicle to move forward out of a current adverse condition (e.g., out of a rut, out of a muddy patch, off of a patch of ice, etc.) and to a location where there is more traction. In an example reverse crawl operation, a similar process occurs but the left wheels are turned to the left, the right wheels are turned to the right, and all of the wheels are driven in the reverse direction. This results in a net positive force in the reverse direction, which drives or moves the vehicle backward or in the rearward direction. This type of movement generated by the wheels during the left, right, forward, and reverse crawl operations may be considered screw propulsion.

In another example, both the front and rear wheels are turned in the same direction to provide a diagonal movement of the vehicle (diagonal driving mode). This allows a vehicle on a tight trail to traverse an obstacle. In yet another example, the wheels on one side of the vehicle may be driven forward while the wheels on the other side of the vehicle are stationary or in reverse to rotate the vehicle about a central axis, i.e., tank turn. In a further example, an inside back wheel is braked while the outside wheel(s) and/or the inner front wheel are powered forward to provide a sharper turn (i.e., reduce the turning radius of the vehicle). This may be referred to as trail turn assist.

In some examples, the controller performs one or more of these operations in response to a request from a driver (or another person). For example, the driver may actuate an input(s) in the cabin of the vehicle to request one of the above-described maneuvers. The controller then activates the steering actuators, drive motors, and/or other systems to perform the selected operation. In some examples, the controller modulates (e.g., increases or decreases) power to the front and/or rear driving motors to limit (e.g., prevent or reduce the likelihood of) rotation of the vehicle. In some examples, the controller continues to drive the wheels until the driver enters a cancel command. For example, the driver may sit in the vehicle and wait while the vehicle moves. When the driver determines the vehicle as desired, the driver can cancel or deactivate the operation. Additionally or alternatively, the controller may continue to drive the wheels until the controller determines the wheels have gained sufficient traction (e.g., based on measurements from one or more wheel torque or speed sensors). In another example, the controller may continue to drive the wheels until the vehicle has moved a certain distance (e.g., 5 feet) from its original location, such that the vehicle is likely in a location with more traction. When the controller cancels or deactivates the operation, the controller stops driving the wheels and returns the wheels to their middle or neutral position, at which point the vehicle can resume a normal driving mode. In other examples disclosed herein, the controller enables the driver to control the steering of the wheels and/or power applied to the wheels.

In some examples disclosed herein, the vehicle includes two steering actuators including a front steering actuator for steering the front wheels and a rear steering actuator for steering the rear wheels. In other examples, the vehicle includes four steering actuators, one for each wheel, such that each wheel can be independently steered. In some examples disclosed herein, the vehicle includes two drive motors (e.g., electric motors) including a front drive motor for driving (e.g., powering) the front wheels and a rear drive motor for driving the rear wheels. In other examples, the vehicle can include four (or more) drive motors, one for each wheel, such that each wheel can be independently driven. As used herein, the directions left and right are relative to a seated position in the vehicle looking forward.

FIG. 1 illustrates an example vehicle 100 in which the examples disclosed herein can be implemented. The vehicle 100 includes a left front wheel 102a, a right front wheel 102b, a left rear wheel 102c, and a right rear wheel 102d. The vehicle 100 may have four-wheel steering capabilities, as disclosed in further detail herein. In this example, the vehicle 100 is depicted as a pickup truck. However, the example vehicle 100 can be implemented as any type of four-wheeled vehicle, such as a car, a van, a dune-buggy, a recreational vehicle (RV), an all-terrain-vehicle (ATV), etc.

Figure 2:
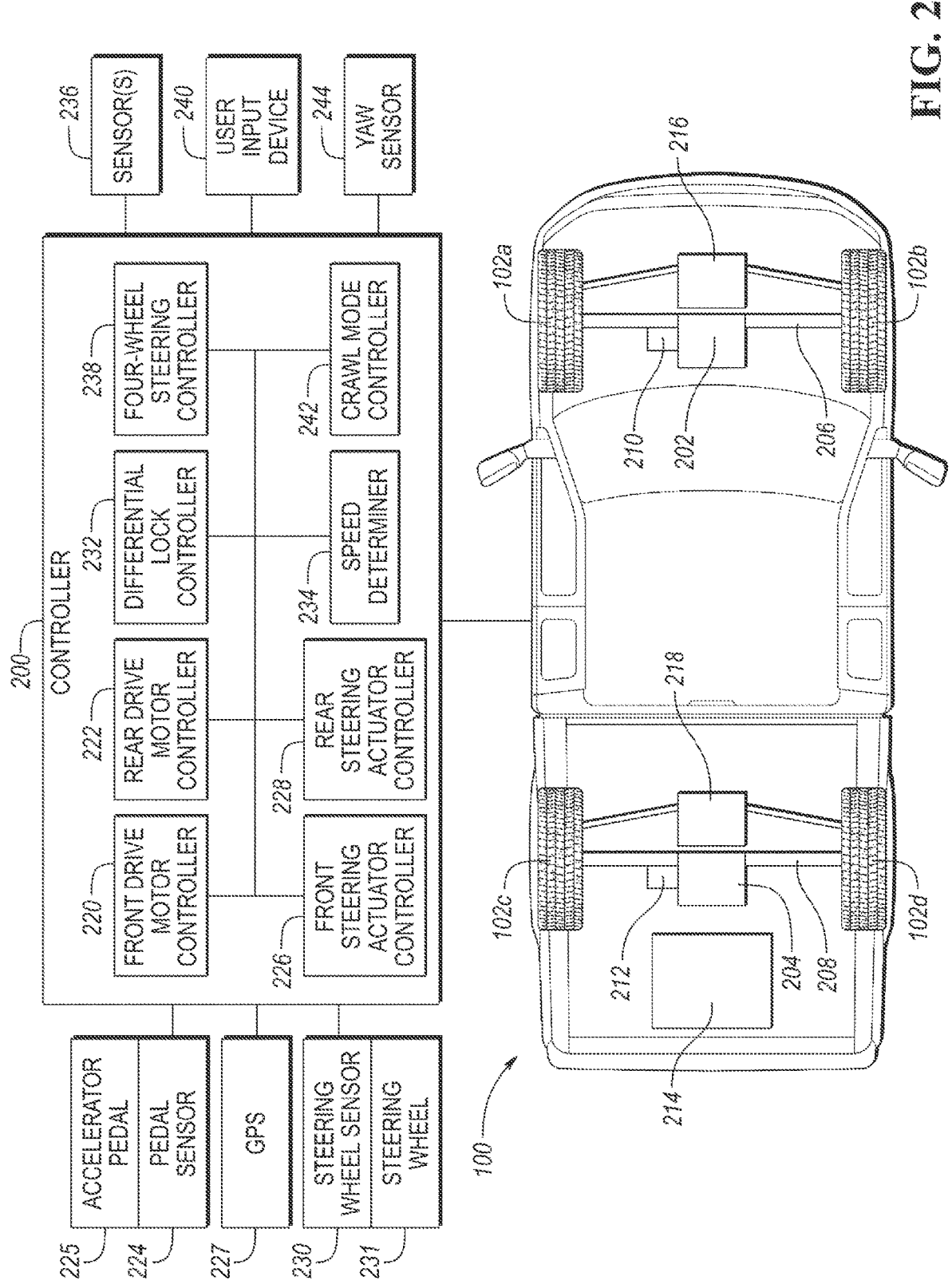
FIG. 2 illustrates a top view of the example vehicle of FIG. 1 and an example controller implemented in connection with the vehicle.

FIG. 2 shows a top view of the vehicle 100 including a number of steering and drive components of the vehicle 100. FIG. 2 also shows a block diagram of a controller 200, that is implemented in the vehicle 100 and that controls various components of the vehicle 100.

In this example, the vehicle 100 is an electric vehicle that includes one or more electric motors to drive the wheels 102a-102d. For example, the vehicle 100 includes a front drive motor 202 (e.g., a first electric motor) to drive the left and right front wheels 102a, 102b, and a rear drive motor 204 (e.g., a second electric motor) to drive the left and right rear wheels 102c, 102d. The front drive motor 202 can drive the left and right front wheels 102a, 102b in a forward direction or a reverse direction. The front drive motor 202 transfers power to the left and right front wheels 102a, 102b via a front differential 206. Similarly, the rear drive motor 204 can drive the left and right rear wheels 102c, 102d in the forward direction or reverse direction and transfers power to the left and right rear wheels 102c, 102d via a rear differential 208. In other examples, the vehicle 100 can include separate drive motors for each of the wheels 102a-102d, such that each of the wheels 102a-102d can be independently driven. In the illustrated example, the vehicle 100 includes a front differential locker 210 for locking the front differential 206 (such that the left and right front wheels 102a, 102b rotate at the same speed) and a rear differential locker 212 for locking the rear differential 208 (such that the left and right rear wheels 102c, 102d rotate at the same speed). The vehicle 100 includes a battery 214 (e.g., a lithium-ion battery) to power the front and rear drive motors 202, 204 as well as other electrical components of the vehicle 100.

The vehicle 100 may include four-wheel steering having a front steering actuator 216, e.g., a rack-and-pinion assembly or a steering box, for steering the left and right front wheels 102a, 102b, and a rear steering actuator 218 for steering the left and right rear wheels 102c, 102d. In this example, the front steering actuator 216 operates to turn the left and right front wheels 102a, 102b simultaneously in the same direction. Similarly, the rear steering actuator 218 operates to turn the left and right rear wheels 102c, 102d simultaneously in the same direction. The rear steering actuator 218 can be operated to turn the left and right rear wheels 102c, 102d in the same direction or opposite direction as the left and right front wheels 102a, 102b. In other examples, the vehicle 100 may include separate steering actuators for each of the wheels such that each of the wheels 102a-102d can be independently steered. An example of this is disclosed in applicant's co-pending application Ser. No. 17/039,224 (filed Sep. 30, 2020), which is incorporated by reference in its entirety herein.

In the illustrated example, the controller includes a front drive motor controller 220 that controls the front drive motor 202. The front drive motor controller 220 can activate the front drive motor 202 to drive the left and right front wheels 102a, 102b in the forward direction or reverse direction as well as control the speed of rotation of the left and right front wheels 102a, 102b, such as during speed control. The controller 200 includes a rear drive motor controller 222 that controls the rear drive motor 204. The rear drive motor controller 222 can activate the rear drive motor 204 to drive the rear wheels 102c, 102d in the forward direction or reverse direction as well as control the speed of rotation of the left and right rear wheels 102c, 102d. During the normal driving mode, the front and rear drive motor controllers 220, 222 control the torque at the wheels 102a-102d based on input from a pedal sensor 224 that measures the position of an accelerator pedal 225.

The controller 200, while illustrated as one controller, may be part of a larger control system and may be controlled by various other controllers throughout the vehicle 100, such as a vehicle system controller (VSC). It should therefore be understood that the controller 200 and one or more other controllers can collectively be referred to as a "controller" that controls various actuators in response to signals from various sensors to control functions. Controller 200 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller 200 may communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 200 within each of the subsystems identified above.

In the illustrated example, the controller 200 includes a front steering actuator controller 226 that controls the front steering actuator 216. The front steering actuator controller 226 can activate the front steering actuator 216 to turn or steer the left and right front wheels 102a, 102b to the left or the right by any degree or angle within a turning limit range (e.g., ±40°). The controller 200 includes a rear steering actuator controller 228 that controls the rear steering actuator 218. The rear steering actuator controller 228 can activate the rear steering actuator 228 to turn or steer the left and right rear wheels 102c, 102d to the left or the right by any degree or angle within a turning limit range (e.g., ±25°). During normal driving mode, the front and/or rear steering actuator controllers 226, 228 control the front and rear steering actuators 216, 218, respectively, based on input from a steering wheel sensor 230 that measures the angle of a steering wheel 231.

In the illustrated example, the controller 200 includes a differential lock controller 232 that controls (e.g., activates or deactivates) the front and rear differential lockers 210, 212. In the illustrated example, the controller 200 includes a speed determiner 234 that determines the speed of the vehicle 100. The speed determiner 234 can determine the speed of the vehicle 100 based on input from one or more sensor(s) 236. The sensor(s) 236 can include wheel speed sensors that are associated with each of the wheels 102a-102d, a global positioning system (GPS) receiver, and/or a camera.

In the illustrated example, the controller 200 includes a four-wheel steering controller 238 that is configured to switch the vehicle 100 between a two-wheel steering mode in which only the front wheels 102a, 102b turn to steer the vehicle 100 and a four-wheel steering mode in which all four wheels 102a-102d turn to steer the vehicle 100. In some examples, the four-wheel steering controller 238 switches between the two and four-wheel steering modes in response to a command from a driver-actuatable input) 240. The input 240 may be, for example, one or more paddles, buttons, and/or switches in the cabin of the vehicle 100. The driver (or another person) may interact with the input(s) 240 to switch between the driving modes.

In a four-wheel steering mode, the rear steering actuator control 228 may be configured to control the rear steering actuator 218 to turn the left and right rear wheels 102c, 102d in the same direction as the left and right front wheels 102a, 102b or the opposite direction as the left and right front wheels 102a, 102b. In some examples, the decision to turn the rear wheels 102c, 102d in the same direction or opposite direction as the front wheels 102a, 102b depends on the speed of the vehicle 100 or driver input 240. For example, during slower speeds, the rear wheels 102c, 102d may be turned in the opposite direction as the front wheels 102a, 102b to enable a tighter turning radius. However, during higher speeds, the rear wheels 102c, 102d may be turned in the same direction as the front wheels 102a, 102b, which increases stability of the vehicle 100 at higher speeds. If the user selects a specific four-wheel steering mode, then the vehicle may operate in that mode unless conditions prevent such operation.

The vehicle 100 may include GPS for determining the location of the vehicle. For example, a GPS unit 227 may be in communication with the controller 200.

Figure 3A:
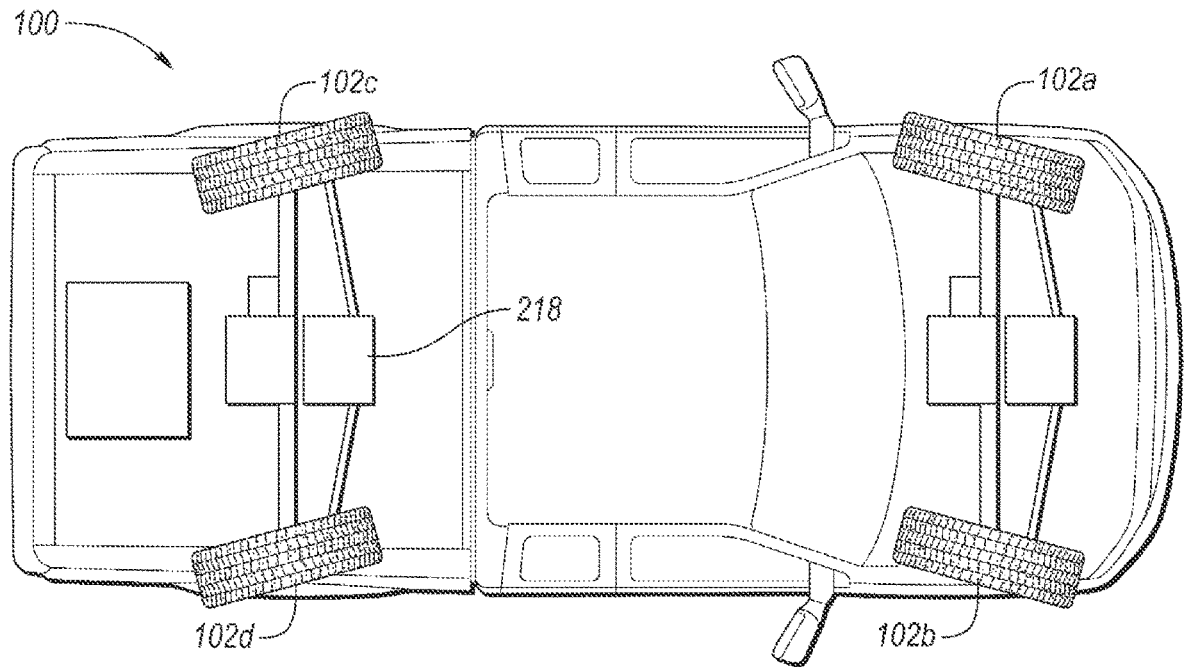
FIG. 3A is a top view of the vehicle during a diagonal driving mode in which all wheels are turned in a same direction.

FIG. 3A shows an example in which the rear steering actuator controller 228 activates the rear steering controller 218 to turn the rear wheels 102c, 102d in the opposite direction as the front wheels 102a, 102b. For example, if the driver turns the steering wheel 231 to the right, the front wheels 102a, 102b may be turned to the right and the rear wheels 102c, 102d may be turned to the left, which is shown in FIG. 3A. Conversely, if the driver turns the steering wheel 231 to the left, the front wheels 102a, 102b may be turned to the left and the rear wheels 102c, 102d may be turned to the right. This increases maneuverability and enables the vehicle 100 to make sharper turns, which is advantageous (especially for larger vehicles) for turning in tight spaces like parking lots.

Figure 3B:
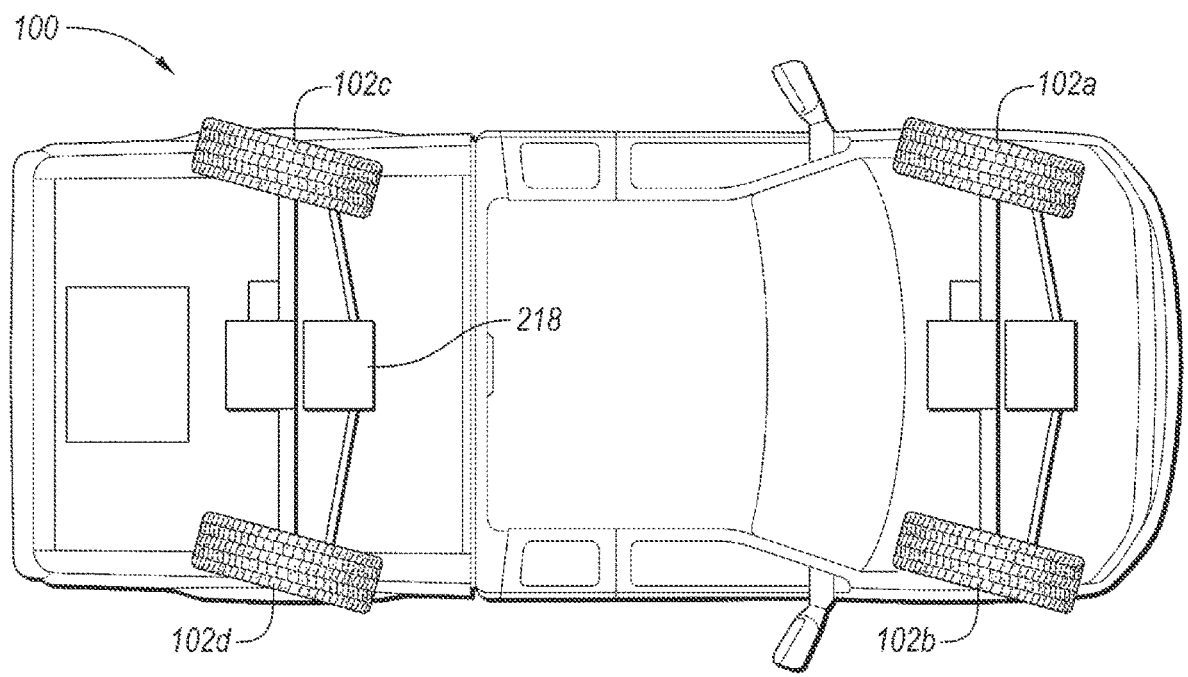
FIG. 3B a top view of the vehicle during another four-wheel steering mode in which the front and rear wheels are pointed in opposite directions.

FIG. 3B shows an example in which the rear steering actuator controller 228 activates the rear steering controller 218 to turn the rear wheels 102c, 102d in the same direction as the front wheels 102a, 102b. Shown here is the vehicle in diagonal driving mode. In diagonal driving mode, the all wheels are turned in the same direction and by the same amount so that the vehicle moves diagonally rather than the front wheels leading and the rear wheels tracking behind. For example, if the driver request turning to the right, the front wheels 102a, 102b are turned to the right and the rear wheels 102c, 102d are turned to the right as well. Similar operation may occur for a left turn.

Figure 4:
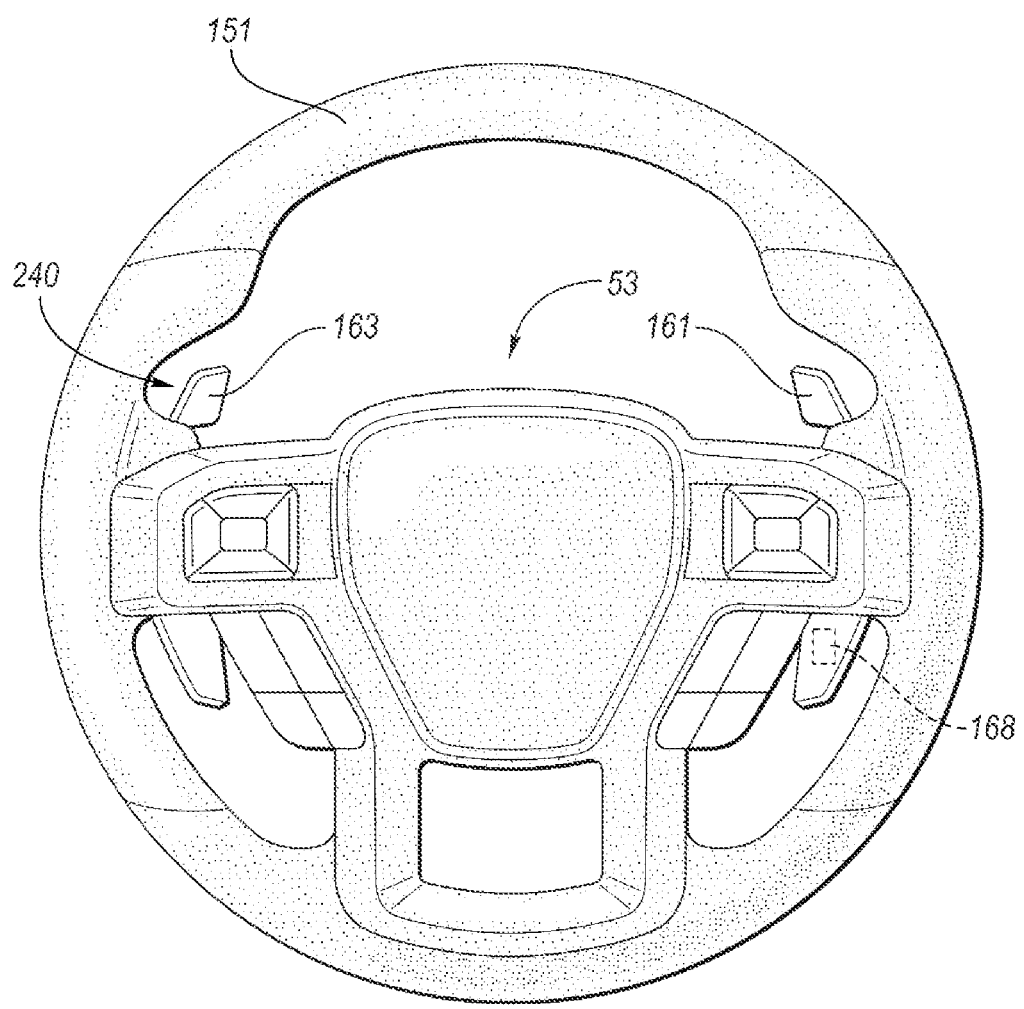
FIG. 4 illustrates an example steering-wheel assembly having left and right driver-actuatable inputs in the form of paddles.

Referring to FIG. 4, input(s) 240 may be a pair of inputs mounted on a steering-wheel assembly 153 or any other location that is easily assessable to the driver. The inputs 240 may be mounted on the steering wheel 153 or the steering column (not shown). The inputs 240 are operable to request a limited-use driving maneuver, such as tank turn, trail turn assist, diagonal driving mode, etc. In the illustrated embodiment, the inputs are paddles 161 and 163. The paddles 161, 163 each include an associated sensor configured to sense actuation (movement or force) of the paddles and output a signal, e.g., an actuation signal, to the controller indicative of an actuation state of the paddle.

In one embodiment, the paddles are ON/OFF switches. Alternatively, the paddles or other input include force sensors rather than a moving input. For example, the paddles 161 and 163 may be stationary and include force sensors for actuation. An example paddle 161 may include at least one variable-force sensor 168. The force sensor 168 is configured to sense an input force and output a signal indicative that force. In this way, the sensor 168 is configured to differentiate between differently applied forces and output different signal values corresponding to the applied force. This allows for variable input control at the paddle rather than a binary on-off switch. The paddle(s) may include more than one force sensor 168 at different locations of the paddle. This allows the driver to control multiple operations on a single paddle. The force sensor(s) may be disposed on a front side of the paddle, a backside of the paddle, or both. The paddles may displace a small amount in some embodiments to provide feedback. Additionally, and alternatively, the paddle may provide haptic feedback or the like to indicate actuation of the force sensor(s) 168. Alternatively, the paddles 161, 163 may move between different (have a travel) and a sensor for determining a position along the travel. The sensor may output different data depending on the position of the paddle so that the controller can determine different actuation states of the paddle, i.e., how far the driver has pulled the paddle. This allows for variable input control at the paddle rather than a binary on-off switch.

As discussed above, the vehicle may be capable of performing various off-road and limit-use maneuvers such as tank turn, diagonal driving mode, trail turn assist, and others. The initiation of these maneuvers may be requested by the driver via the input(s) 240, such as the above-described steering-mounted paddles 161, 163. The vehicle may utilize GPS data from the module 227 to determine the location of the vehicle. If the vehicle determines that the vehicle is off-road, the vehicle may permit operation of the various off-road maneuvers in response to driver request. If the vehicle determines that it is on road, one or more of the off-road maneuvers may be limited or completely disabled.

If more than one steering-based features is available on the vehicle, the driver can set conditions for each via the in-vehicle infotainment display (HMI) such that paddle 1 (e.g., right paddle) could be used for initiating steering feature A (e.g., diagonal steer), paddle 2 (e.g., left paddle) could be used for initiating steering feature B (e.g., tank turn), or switching between steering features can be controlled by holding down both paddles for a set period of time or associated with a specific drive mode, e.g., baja mode. Steering features can also be controlled such that feature A will only operate between speeds of 0-5 MPH, Feature B between 6-10 MPH, etc. Different features can also be enabled based on a specific drive mode being activated (different steering feature for baja mode vs mud mode).

Control logic or functions performed by controller 200 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 200. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
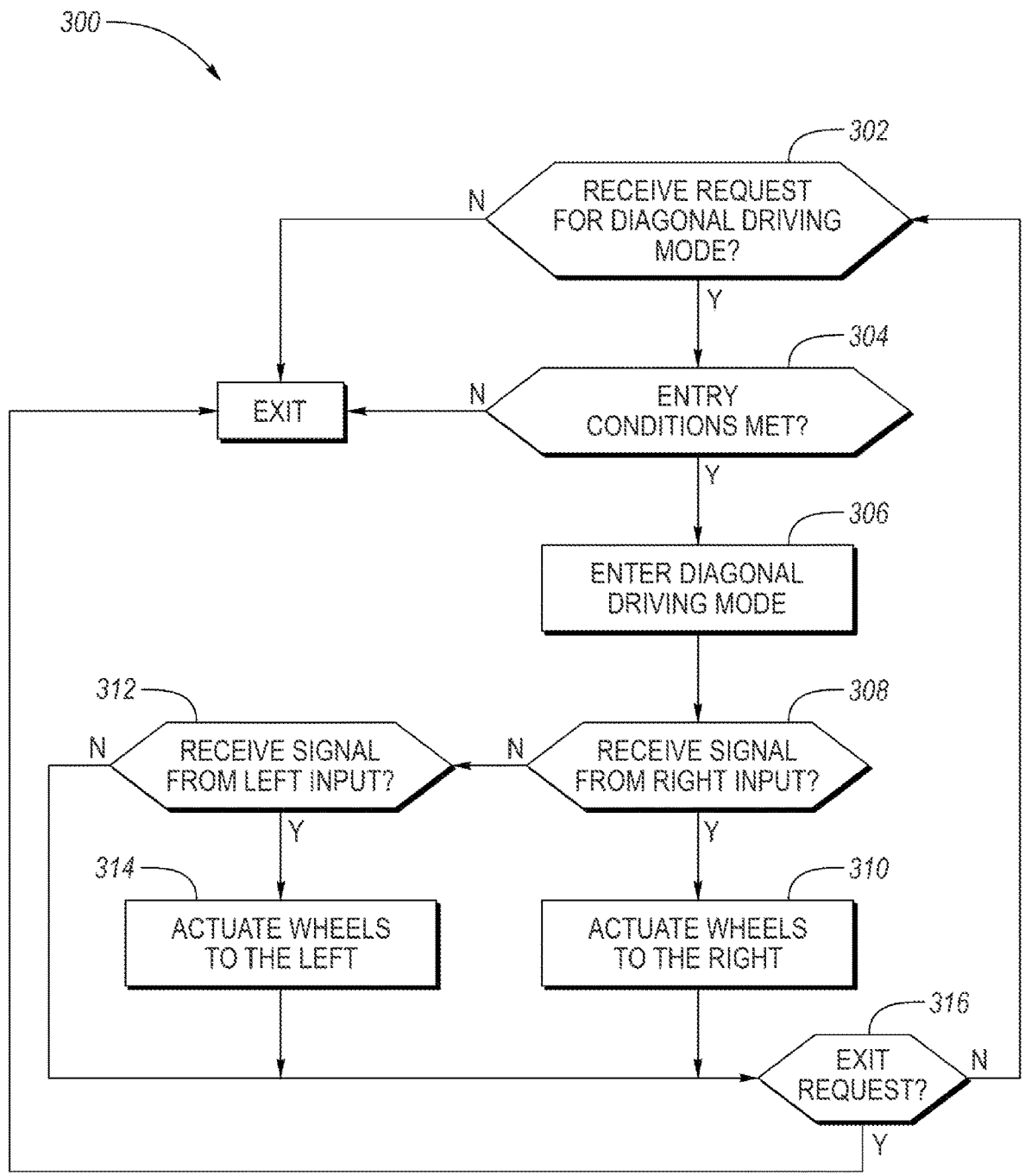
FIG. 5 illustrates a flowchart 300 of an algorithm for controlling the vehicle in a diagonal driving mode.

Referring to FIG. 5, an algorithm 300 for controlling a diagonal driving mode begins at operation 302 with a request for diagonal driving mode. The driver may request diagonal driving mode by operating one or more driver-actuatable inputs. For example, the driver may simultaneously actuate two driver-actuatable inputs, such as steering-wheel paddles, to request the diagonal driving mode. The driver may request by holding the one or more driver-actuatable inputs for a predetermined amount of time, such as three seconds. In response to receiving a request at operation 302, the controller determines if requisite vehicle conditions are met. If no, the diagonal driving mode is exited, at least until the conditions are met. Example conditions include the vehicle speed being less than a threshold (e.g., 15 mph), a GPS unit indicating that the vehicle is off-road, the steering angle being within a threshold window, e.g. ±5° (some embodiments may require the steering be straight), the vehicle being in a particular mode (baja mode, off-road mode, rock mode, trail mode. etc.). If these conditions are not met, such as the vehicle speed exceeds the threshold or the GPS data indicates that the vehicle is on a particular type of road (highway, arterial, and/or collector), the control is exited and the vehicle does not enter into the diagonal driving mode. A prompt may be shown on a display if conditions are not met.

If the conditions are met, control passes to operation 306 where the vehicle enters into the diagonal driving mode. In the diagonal driving mode, the one or more driver-actuatable inputs may be used to steer the vehicle in a particular direction either alone or in conjunction with steering wheel inputs. For example, if the controller receives a signal from a right input at operation 308, the wheels are actuated to the right. That is, the controller, in response to the vehicle being in the diagonal driving mode and the right input being actuated, commands the front and rear steering actuators to turn the left and right front wheels to the right and the left and right rear wheels to the right. The controller may command a same turning angle for all four wheels.

If the right input is not actuated, control passes to operation 312 and the controller determines if the left input has been actuated, e.g., did the controller receive a signal from the left driver-actuatable input? If yes, the vehicle wheels are turned to the left. That is, the controller, in response to the vehicle being in the diagonal driving mode and the left input being actuated, command the front and rear steering actuators to turn the left and right front wheels to the left and the left and right rear wheels to the left. The controller may command a same turning angle for all four wheels.

If during the diagonal driving mode, the driver requests a vehicle speed in excess of a threshold, which may or may not be the same as the threshold for entering into the diagonal driving mode, the controller will either limit the vehicle speed to a predetermined limit or will phase out of the diagonal driving mode into a regular driving mode.

In embodiments in which the driver-actuatable inputs are variable inputs e.g., variable force inputs, the amount of actuation of the input may control the steering angle of the vehicle. For example, the controller may be programmed to, in response to a first force applied to the right input when in the diagonal driving mode, command first and second steering angles (the first and second steering angles may have the same value) to the front and rear steering actuators, respectively, and, in response to a second force applied to the right input when in the diagonal driving mode, command third and fourth steering angles (the third and fourth steering angles may have the same value) to the front and rear steering actuators, respectively. Here, the second force is greater than the first force resulting in additional turning of the wheels to the right. The controller may be further programmed to, in response to a third force applied to the left input when in the diagonal driving mode, command fifth and sixth steering angles (which may be the same value) to the front and rear steering actuators, respectively, and, in response to a fourth force applied to the left input when in the diagonal driving mode, command seventh and eighth steering angles (which may be the same value) to the front and rear steering actuators, respectively. Of course, in other embodiments, the steering wheel may be used, or at least play a role in, steering the vehicle during diagonal driving mode.

The driver may request exiting of the diagonal driving mode at operation 316. For example, the driver may exit the mode by again actuating both of the driver-actuatable inputs for a predetermined amount of time. In response to receiving the request, the controller may exit the diagonal driving mode, which may be accomplished by gradually phasing out the mode in lieu of normal driving.

The diagonal driving mode may limit the angles of the wheel to be less than a physical maximum articulation of the wheels, which may be permitted during normal driving mode. In some embodiments, the wheel angle limit may be based on vehicle speed and/or vehicle mass.

Figure 6:
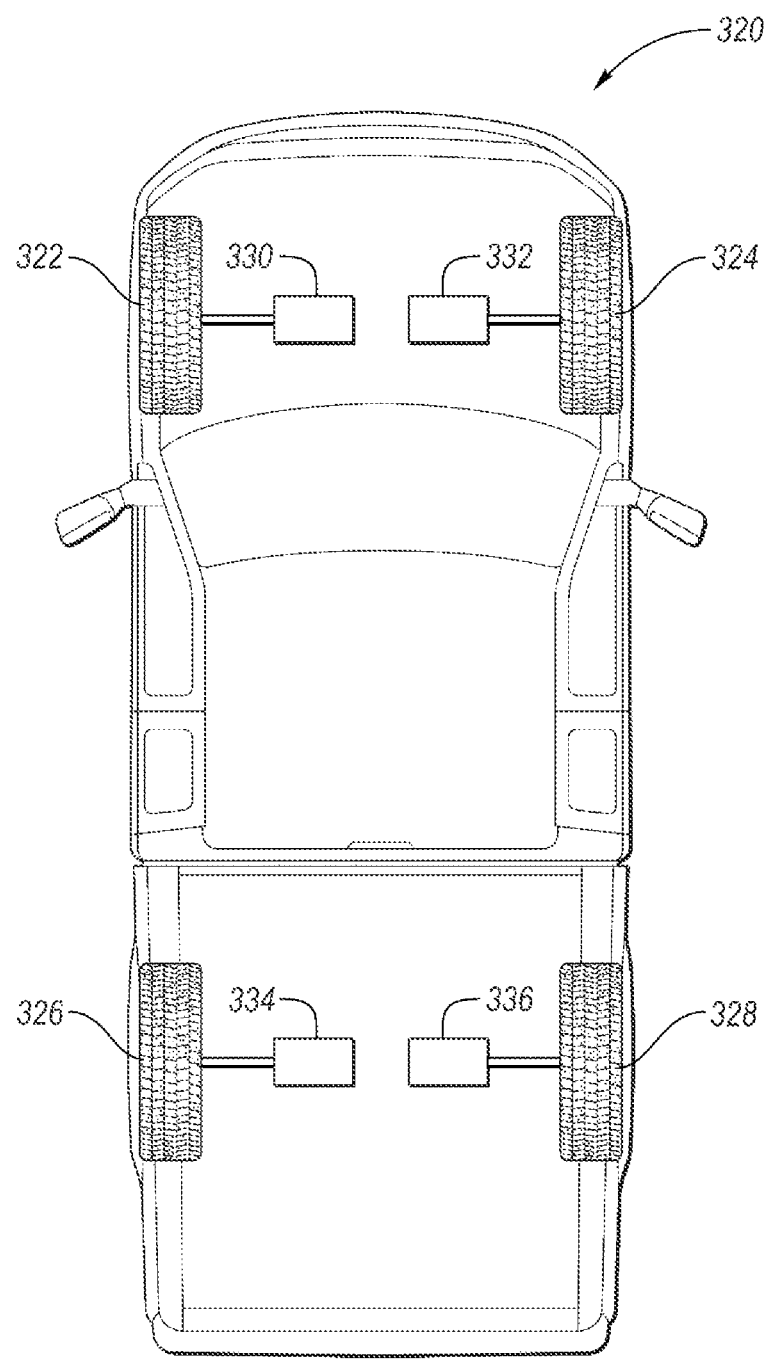
FIG. 6 illustrates a vehicle with individual motors at each of the wheels.

FIG. 6 illustrates an example vehicle 320 that includes wheel motors at each of the four wheels. The vehicle 320 may include a front right motor-and-wheel assembly 322, a front left motor-and-wheel assembly 324, a rear right motor-and-wheel assembly 326, and a rear left motor-and-wheel assembly 328. Each wheel assembly includes a wheel operably coupled to an associated electric machine, e.g., an electric motor. For example, the wheel assembly 322 includes an electric machine 330 connected to the wheel 332. The vehicle 320 may include a controller that is similar to controller 200 described above.

Figure 7:
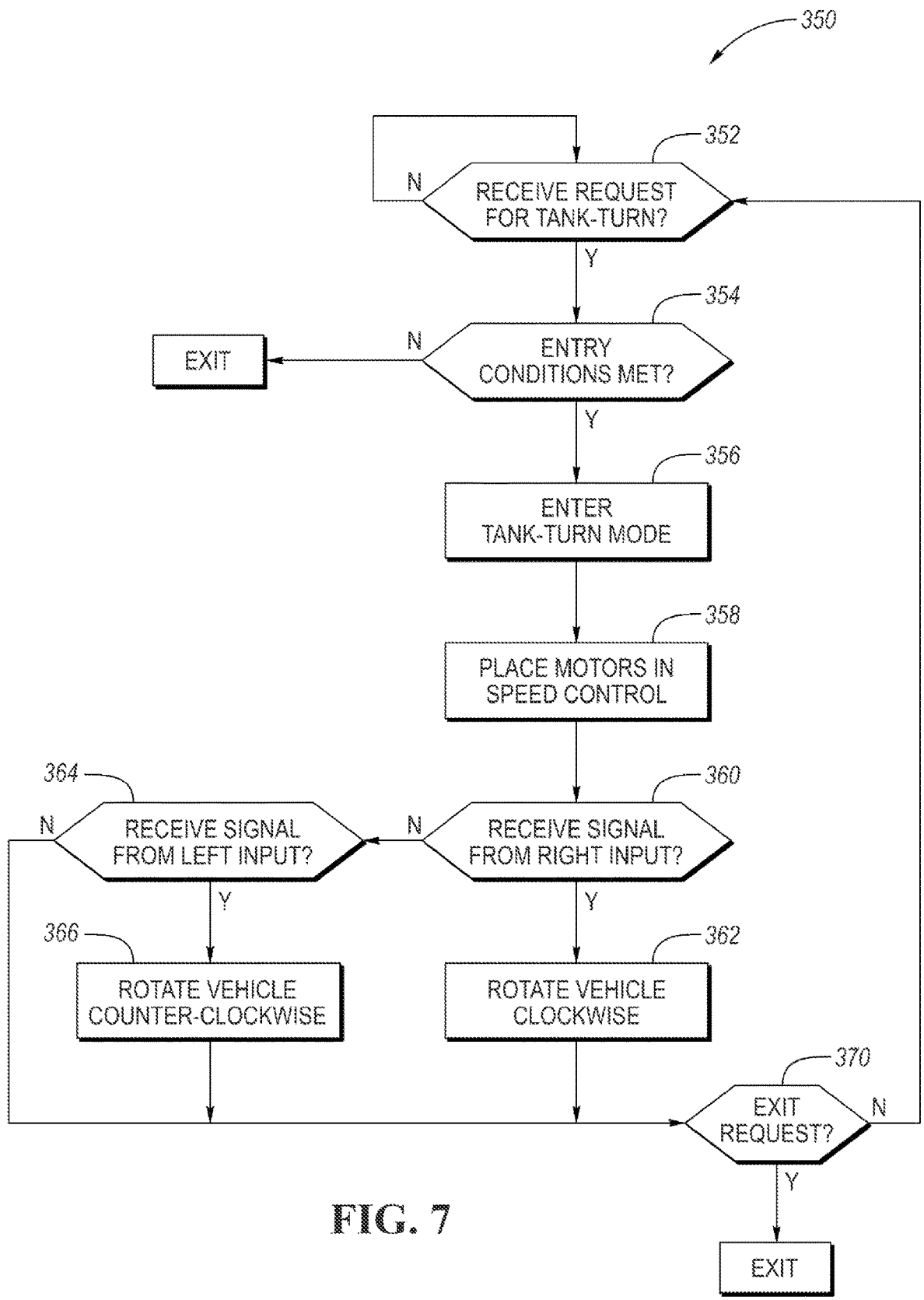
FIG. 7 illustrates a flowchart 350 of an algorithm for controlling the vehicle in a tank-turn mode.

FIG. 7 illustrates an algorithm 350 for controlling a vehicle in a tank-turn mode in which the vehicle is rotated about a central, vertical axis. During tank turn, a first side of the vehicle is driven in a forward direction while a second side of the vehicle is driven in a reverse direction to rotate the vehicle about the axis of rotation. For example, driving the left wheels forward and the right wheels in reverse causes clockwise rotation of the vehicle and driving the right wheels forward and the left wheels in reverse causes counterclockwise rotation of the vehicle. The wheels may remain straight during tank turn.

At operation 352, the controller determines if the driver has made a request for tank turn. The request may be made by actuating one or more driver-actuatable inputs. For example, the driver may simultaneously actuate to driver-actuatable inputs, such as steering-wheel paddles. The request may be requested by holding the one or more driver-actuatable inputs for a predetermined amount of time, such as three seconds.

Upon receiving a driver request for tank-turn mode, the controller determines if entry conditions are met at operation 354. Example conditions include the vehicle speed being less than a threshold (e.g., less than 2 mph), a GPS unit indicating that the vehicle is off-road, the steering angle being within a threshold window, e.g. ±5° (some embodiments may require the steering be straight), the vehicle being in a particular mode (baja mode, off-road mode, rock mode, trail mode. etc.). If the conditions are met, the controller enters into the tank-turn mode at operation 356. In operation 358, controller places the motors of the wheel assemblies into speed control (as opposed to the torque-control). During speed control, a closed-loop controller, such as a PID controller, is used to control the motors to a specific speed target. The controller continuously increases or decreases the torque command to the motor in order to reduce the error between the target speed and the measured speed.

The controller next determines if the driver has requested initiation of the tank-turn maneuver. For example, at operation 360, the controller determines if a signal has been received from the right input. If yes, the controller interprets this as a request to rotate the vehicle clockwise. (In some embodiments, the driver request is actuation of both the driver-actuatable input, e.g., right paddle, and the accelerator pedal.) That is, the controller may be programmed to, in response to the right steering-mounted driver-actuatable input being actuated, command forward propulsion of the left front and rear motor-and-wheel assemblies and command reverse propulsion of the right front and rear motor-and-wheel assemblies to create clockwise rotation of the vehicle. If no at operation 360, control passes to operation 364.

At operation 364, the controller determines if a signal has been received from the left input. If yes, the controller interprets this as a request to rotate the vehicle counterclockwise. (In some embodiments, the driver request is actuation of both the driver-actuatable input, e.g., left paddle, and the accelerator pedal.) That is, the controller may be programmed to, in response to the accelerator pedal being depressed and the left steering mounted driver-actuatable input being actuated, command forward propulsion of the right front and rear motor-and-wheel assemblies and command reverse propulsion of the left front and rear motor-and-wheel assemblies.

The speeds commanded to the motors of the wheel assemblies may be based on accelerator pedal position and/or a position of the driver-actuatable input, e.g., a variable-force sensor of the driver-actuatable input. For example, each of the driver-actuatable inputs include a variable-force sensor configured to output a signal indicative of a force applied to the controller. The controller may be programmed to, in response to a first force applied to the right input when in the tank-turn mode, command first speeds to the motor-and-wheel assemblies, and in response to a second, larger force applied to the right input when in the tank-turn mode, command second, higher speeds to the motor-and-wheel assemblies.

Alternatively, angular velocity of the vehicle during the tank turn may be a predetermined speed, which may be customizable by the driver. Here, the user simply initiates the take turn in the desired direction and the vehicle automatically rotates in that direction at the predetermined speed until the driver requests the vehicle to stop rotating. For example, the driver may request exiting of the tank turn at operation 370 by actuating a user-actuatable input, such as a paddle mounted on the steering wheel or column. That is, once in the tank-turn mode, the driver may poll the right paddle to initiate clockwise rotation and again pulls the right paddle to stop rotation. Similar procedures may be used to rotate counterclockwise.

The vehicle may monitor surroundings during the rotation of the vehicle. If an object is detected, the vehicle may automatically stop rotation and exit the tank-turn mode. A display visible by the driver may provide a text box or the like informing the driver of the detected objects and the exiting of the mode.

The vehicle may also have Trail Turn Assist that slows the rear inside wheel to facilitate turning in off-road driving. Trail Turn Assist can be controlled via the paddles or other driver-actuatable input. For example, the vehicle may determine the speed is below a predetermined threshold or within a predetermined range to ensure use is confined to specific vehicle speeds.

The paddles may be used to control the speed differential between the vehicle ground speed and the rotational speed of the inside rear wheel relative to the vehicle turn direction when the steering wheel is turned beyond a predetermined threshold. (The controller will convert between the wheel speed domain and ground speed domain.) When the paddle is not pulled at all, the vehicle will attempt to keep all four wheels at the same speed as the vehicle's ground speed, e.g., manage slip through traction control. When a paddle is depressed, the vehicle will enter a speed control mode where the wheel speed of the inside rear wheel will be held at a lower calibratable value than the vehicle ground speed to allow the vehicle to turn more rapidly. In speed control, the wheel speed target (such as an angular velocity) is set and the vehicle controls an associated motor or friction brake to achieve the target. For example, closed loop feedback controls, e.g., PID controller, increase and decrease the braking to reduce the error between measured wheel speed (e.g., from a wheel speed sensor) and the speed target. The target speed may be limited to prevent a large speed differential between the rear inside wheel and the other wheels. For example, if the vehicle is moving 15 MPH, a rear wheel speed of zero could be realized; however, if the vehicle is moving at 50 MPH, the rear wheel speed could be limited to a percentage or absolute value of vehicle speed such as 70 percent below vehicle speed.

The target speed may be based on how far the paddle is pulled or how much force is applied. For example, the vehicle brake control module may interpolate between 0 speed differential (paddle not actuated) and the full speed differential (paddle shifter completely actuated).

Once this speed control mode is activated, the brake control module of the rear axle will send a brake torque request (either regenerative or friction braking) to slow down the inside rear wheel to the desired speed differential, i.e., track the speed target.

Figure 8:
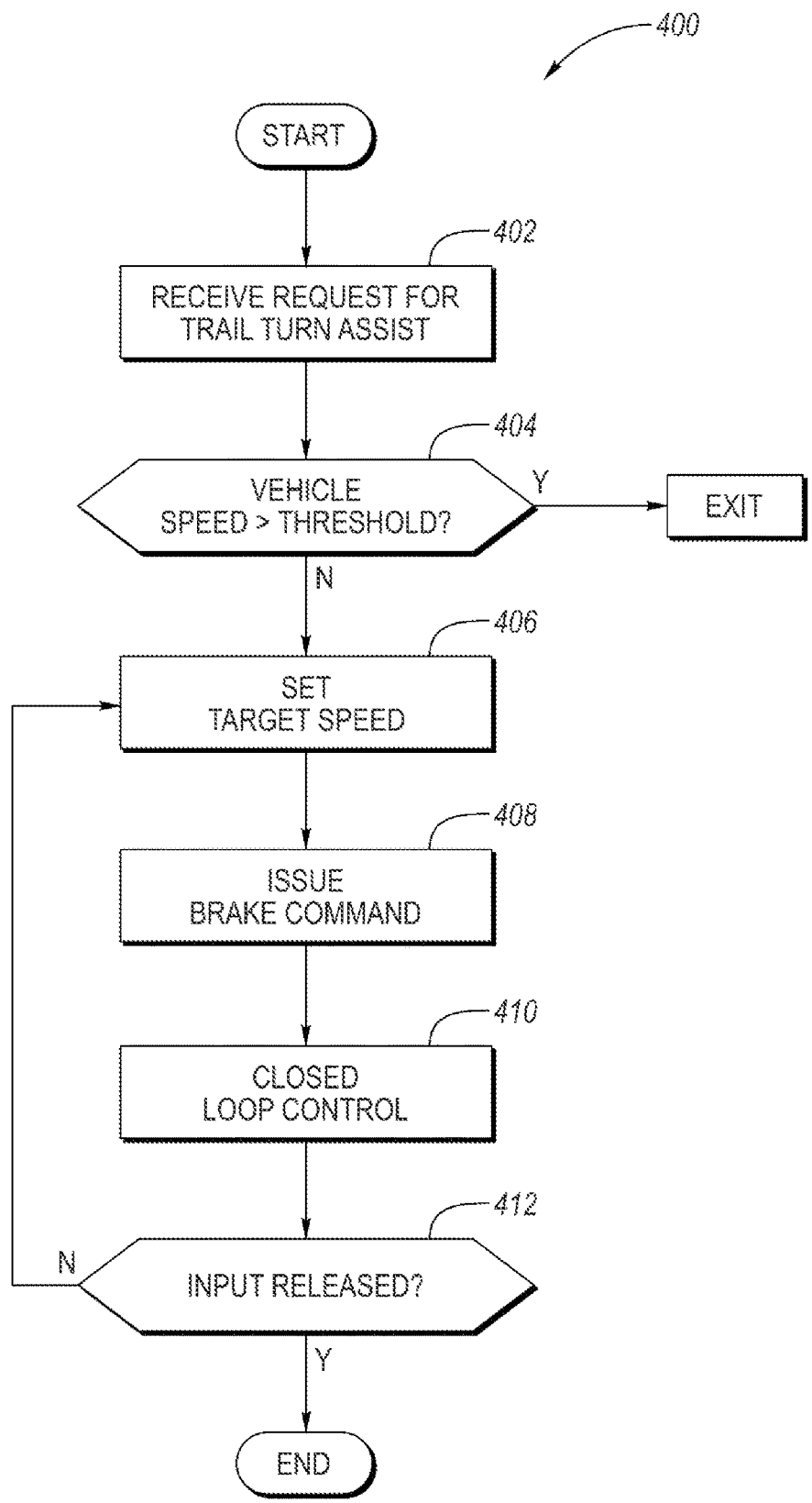
FIG. 8 is a flowchart 400 of an algorithm for controlling the vehicle with trail turn assist.

FIG. 8 illustrates an algorithm 400 for trail turn assist. Control begins at operation 402 when a request for trail turn assist is received. The driver may request trail turn assist by actuating one or more of the driver-actuatable inputs. For example, the vehicle may include left and right paddles mounted to the steering column or steering wheel. The driver may request trail turn assist to the right or to the left by pulling the right or left paddle, respectively. Actuation of the paddles causes a signal to be sent to the controller, which interprets the signal as a request for trail turn assist to the right or to the left. The controller may initiate trail turn assist in response to receiving a signal from a driver-actuatable input, e.g., a paddle, in conjunction with the steering wheel being turned beyond threshold. At operation 404, the controller determines if the vehicle speed is less than the threshold. If no, trail turn assist is not available. If yes, the controller sets a target speed for the inside rear wheel at operation 406.

At operation 406, the speed target may be based on a single factor or a plurality of factors—such as the speed of the vehicle, the amount of actuation of the driver-actuatable input (when the driver-actuatable input has variable output), and/or steering angle. In one embodiment, the paddles include a range of travel or variable-force sensors that allow the driver to request more or less braking of the inside rear wheel. In these embodiments, the signal received by the controller delineates a position or force of the input and the controller sets the target speed of the rear inside wheel based on this position or force. In this way, the controller will increase the amount of braking as the amount of actuation on the paddle increases and will decrease the amount of braking as the amount of actuation on the paddle decreases, for example.

At operation 410, the controller enters into speed control of the inside rear wheel, e.g., closed-loop control. During the closed-loop control, the braking command (either regenerative or friction) to the inside rear wheel is increased and decreased in order to reduce an error between the target speed of the inside rear wheel and a measured speed of the inside rear wheel. The closed-loop feedback control continues until the driver-actuatable input is released at operation 412. During this process, the speed target may vary based on the speed of the vehicle, position of the paddle, the steering angle, and the like.

Vehicles according to this disclosure may include one or more of the above-described driving modes. For example, some vehicles may include all of the above-described driving modes, whereas others may only include one of the driving modes. In further embodiments, a vehicle may include two of the above-described driving modes. A user may be able to configure which of the driving modes are controlled by steering-mounted paddles as opposed to another driver-actuatable input. In some embodiments, the driver may use an HMI (other than the paddles) for entering into one of the modes and then using the paddles to operate the vehicle in that mode as described above. In other embodiments, the paddles will be used to control the mode that is available. For example, if the mode, such as tank turn, is precluded due to vehicle speed but another operating mode, such as trail turn assist is available, then the paddles may be used to operate the trail turn assist without additional input from the driver.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a front axle including left and right front wheels and a front steering actuator configured to turn the left and right front wheels;
   a rear axle including left and right rear wheels and a rear steering actuator configured to turn the left and right rear wheels;
   a steering-wheel assembly including a steering wheel;
   left and right driver-actuatable paddle inputs supported by the steering wheel assembly, wherein each of the paddles inputs includes a variable-force sensor configured to output a signal indicative of a force applied; and
   a controller programmed to:
   in response to vehicle speed being less than a threshold and both of the driver-actuatable inputs being actuated, command a diagonal driving mode,
   in response to the vehicle being in the diagonal driving mode, the steering wheel being centered, and the right input being actuated, immediately command the front and rear steering actuators to turn the front wheels to the right and the rear wheels to the right,
   in response to the vehicle being in the diagonal driving mode, the steering wheel being centered, and the left input being actuated, immediately command the front and rear steering actuators to turn the front wheels to the left and the rear wheels to the left,
   in response to a first force applied to the right input when in the diagonal driving mode, command first and second steering angles to the front and rear steering actuators, respectively, and
   in response to a second force applied to the right input when in the diagonal driving mode, command third and fourth steering angles to the front and rear steering actuators, respectively.

2. The vehicle of claim 1 further comprising a GPS unit, wherein commanding the diagonal driving mode is further in response to data from the GPS unit indicating that the vehicle is off-road.

3. The vehicle of claim 1 further comprising a GPS unit, wherein the controller is further programmed to inhibit the diagonal driving mode in response to data from the GPS unit indicating that the vehicle is on-road.

4. The vehicle of claim 1, wherein the controller is further programmed to,
   in response to a third force applied to the left input when in the diagonal driving mode, command fifth and sixth steering angles to the front and rear steering actuators, respectively, and
   in response to a fourth force applied to the left input when in the diagonal driving mode, command seventh and eighth steering angles to the front and rear steering actuators, respectively.

5. The vehicle of claim 1, wherein the controller is further programmed to exit the diagonal driving mode in response to both of the driver-actuatable inputs being actuated when the diagonal driving mode is active.

6. The vehicle of claim 1, wherein, during the diagonal driving mode, steering angles commanded to the front and rear steering actuators are based on the vehicle speed.

7. A vehicle comprising:
a front axle including left and right front wheels and a front steering actuator configured to turn the left and right front wheels;
a rear axle including left and right rear wheels and a rear steering actuator configured to turn the left and right rear wheels;
a steering-wheel assembly including a steering wheel;
left and right driver-actuatable paddles supported by the steering wheel assembly and each including a variable-force sensor configured to output a signal indicative of a force applied; and
a controller programmed to:
in response to vehicle speed being less than a threshold and both of the driver-actuatable inputs being actuated, command a diagonal driving mode,
in response to the vehicle being in the diagonal driving mode and the right input being actuated, command the front and rear steering actuators to turn the front wheels to the right and the rear wheels to the right, without requiring movement of the steering wheel, such that steering in the diagonal driving mode is performed independently of the steering wheel,
in response to the vehicle being in the diagonal driving mode and the left input being actuated, command the front and rear steering actuators to turn the front wheels to the left and the rear wheels to the left, without requiring movement of the steering wheel, such that steering in the diagonal driving mode is performed independently of the steering wheel,
in response to a first force applied to the right input when in the diagonal driving mode, command first and second steering angles to the front and rear steering actuators, respectively, and
in response to a second force applied to the right input when in the diagonal driving mode, command third and fourth steering angles to the front and rear steering actuators, respectively.

8. The vehicle of claim 7 further comprising a GPS unit, wherein commanding the diagonal driving mode is further in response to data from the GPS unit indicating that the vehicle is off-road.

9. The vehicle of claim 7 further comprising a GPS unit, wherein the controller is further programmed to inhibit the diagonal driving mode in response to data from the GPS unit indicating that the vehicle is on-road.

10. The vehicle of claim 7, wherein the controller is further programmed to, in response to a third force applied to the left input when in the diagonal driving mode, command fifth and sixth steering angles to the front and rear steering actuators, respectively, and in response to a fourth force applied to the left input when in the diagonal driving mode, command seventh and eighth steering angles to the front and rear steering actuators, respectively.

11. The vehicle of claim 7, wherein the controller is further programmed to exit the diagonal driving mode in response to both of the driver-actuatable paddles being actuated when the diagonal driving mode is active.

12. The vehicle of claim 7, wherein, during the diagonal driving mode, steering angles commanded to the front and rear steering actuators are based on the vehicle speed.

* * * * *